(12) United States Patent
Lueckhoff et al.

(10) Patent No.: US 7,213,209 B2
(45) Date of Patent: May 1, 2007

(54) CUSTOMIZED SCRIPTING

(75) Inventors: Hermann Lueckhoff, Sunnyvale, CA (US); Octavian N. Iancu, Sunnyvale, CA (US); Armando Chavez, Cupertino, CA (US); Adam Korman, Redwood City, CA (US); Deborah Rodgers, Framingham, MA (US)

(73) Assignee: SAP Aktiengesellschaft, Walldorf ( * ) Notice: Subject to any disclaimer, the term of this patent is extended or adjusted under 35 U.S.C. 154(b) by 845 days.

(21) Appl. No.: 10/327,692

(22) Filed: Dec. 20, 2002

(65) Prior Publication Data

US 2004/0080535 A1    Apr. 29, 2004

Related U.S. Application Data

(60) Provisional application No. 60/421,364, filed on Oct. 25, 2002.

(51) Int. Cl.
  G06F 13/00 (2006.01)
  G06F 15/00 (2006.01)
(52) U.S. Cl. .................................. 715/747; 715/748
(58) Field of Classification Search ............... 715/763, 715/765, 762, 760, 854, 747, 748, 853, 840
See application file for complete search history.

(56) References Cited

U.S. PATENT DOCUMENTS 6,100,891 A    8/2000    Thorne

2002/0022986 A1    2/2002    Coker et al.
2003/0074463 A1*   4/2003    Swartz et al. ............... 709/230
2004/0002907 A1*   1/2004    Tosswill ...................... 705/34

FOREIGN PATENT DOCUMENTS

WO    01/67225    9/2001

OTHER PUBLICATIONS

"User documentation for SAP's earlier version of scripting," Written by SAP CRM Documentation Group, Published in Aug. 2000, 6 pgs.

* cited by examiner

Primary Examiner—Cao (Kevin) Nguyen
(74) Attorney, Agent, or Firm—Fish & Richardson P.C.

(57) ABSTRACT

Various implementations of the present invention provide systems and methods for customized scripting. One implementation provides for a visual display of a script to a user. The user makes use of the script in communicating with a specified person during a session. A computing system receives information relating to a specific session being conducted with the specified person. The computing system then processes the received information to generate output information that specifies a display of a customized script. The customized script contains a standard script determined by the specific session being conducted and information particular to the specified person. The output information is then received at a display device, and a display is generated thereon of the customized script for use by the user during the specific session with the specified person.

18 Claims, 11 Drawing Sheets

CUSTOMIZED SCRIPTING

RELATED APPLICATION

The present application claims the benefit of the filing date of U.S. Provisional Application No. 60/421,364, which was filed on Oct. 25, 2002. The contents of U.S. Provisional Application No. 60/421,364 are hereby incorporated by reference into the present application in their entirety.

TECHNICAL FIELD

This invention relates to computing systems, and more particularly to providing scripts in such systems to a user for effectively communicating with others.

BACKGROUND

In recent years, telephone call centers have become much more widespread. The call centers manage many efforts, and calling agents working in these centers often place thousands of calls to various customers in different regions of the country. These agents often use headsets to speak with customers while the agents concurrently enter information relating to the customers into a computer workstation.

Under the traditional approach, companies interacted with potential customers in person. Telephone call centers have become more widespread as a result of a desire by many of such companies to interact with customers via telephone instead. Using this form of communication, calling agents are able to conduct many transactions in a short period of time.

There are a wide variety of transactions carried out by these telephone call centers. For example, banks may want to contact current customers and ask them customers if they would be interested in obtaining a new credit card. Long distance telephone companies may want to contact homeowners and ask if they would be interested in switching long distance carriers. Fund raisers may call individuals to ask for donations. And various other telemarketers may call homeowners or business owners for solicitation of various products or services.

Because there are so many different types of customers and transaction types, calling agents who work in telephone call centers will often need extensive training. It is often difficult for the agents to perform certain tasks that involve multiple steps (such as introducing a purchase order, making a sale, introducing a service order, etc.) without a significant amount of training. The agents often do not know how to navigate through the different steps that are needed to complete such tasks. In order to allow the calling agents to navigate through the system without difficulty, companies may need to spend large amounts of time and money for training. They may require training for customer service, as well as training for the various forms of product or service types being solicited.

As a result, many telephone call centers utilize calling scripts that can be used by the agents. When the agents interact with customers, they can simply read these scripts to the customers rather than having to commit a script to memory. Scripts are very helpful in such situations, because they can provide the agents with detailed information for use in the dialogues with customers.

In addition to the use of scripts, telephone call centers may implement an entire scripting program for use by their agents. For example, when using a first script for the program, a telephone call agent may ask a customer a question. The response will be entered into the call center system by the agent, such as by depressing a predetermined button on the agent's keyboard or by selecting the proper response from a list using a mouse or other pointing device. As a result of this feedback from the customer, the scripting program will then determine and display the next predetermined script for that program.

These scripting programs have proven to be very useful. The scripts provided in such programs, however, contain certain limitations. For example, the traditional scripting programs provide predetermined script information. Though the scripts may be particular to the scenario presented in the session between a calling agent and a customer, the contents of the scripts contained predetermined information that is static (i.e., not configurable at run time). As such, calling agents may still be required to remember specific information pertaining to the session with the customer.

SUMMARY

Various implementations of the present invention provide systems and methods for customized scripting. One implementation provides for a visual display of a script to a user. The user makes use of the script in communicating with a specified person during a session. A computing system receives information relating to a specific session being conducted with the specified person. The computing system then processes the received information to generate output information that specifies a display of a customized script. The customized script contains a standard script determined by the specific session being conducted and information particular to the specified person. The output information is then received at a display device, and a display is generated thereon of the customized script for use by the user during the specific session with the specified person.

Advantages of certain implementations of the invention may be one or more of the following. Customized scripting may be used to capture the business expertise in a company, wherein scripts are used to standardize various processes. Customized scripting enables call center agents to have high quality interactions with customers by limiting the number of choices the agents need to make and amount of knowledge they need to have, in order to have an effective customer interaction. The agents do not need as much training, because the complexities of transactions are reduced. In addition, the customized scripts contain information that is particular to the given customer, thereby personalizing the interactive session.

The details of one or more implementations of the invention are set forth in the accompanying drawings and the description below. Other features, objects, and advantages of the invention will be apparent from the description and drawings, and from the claims.

DETAILED DESCRIPTION

Figure 1:
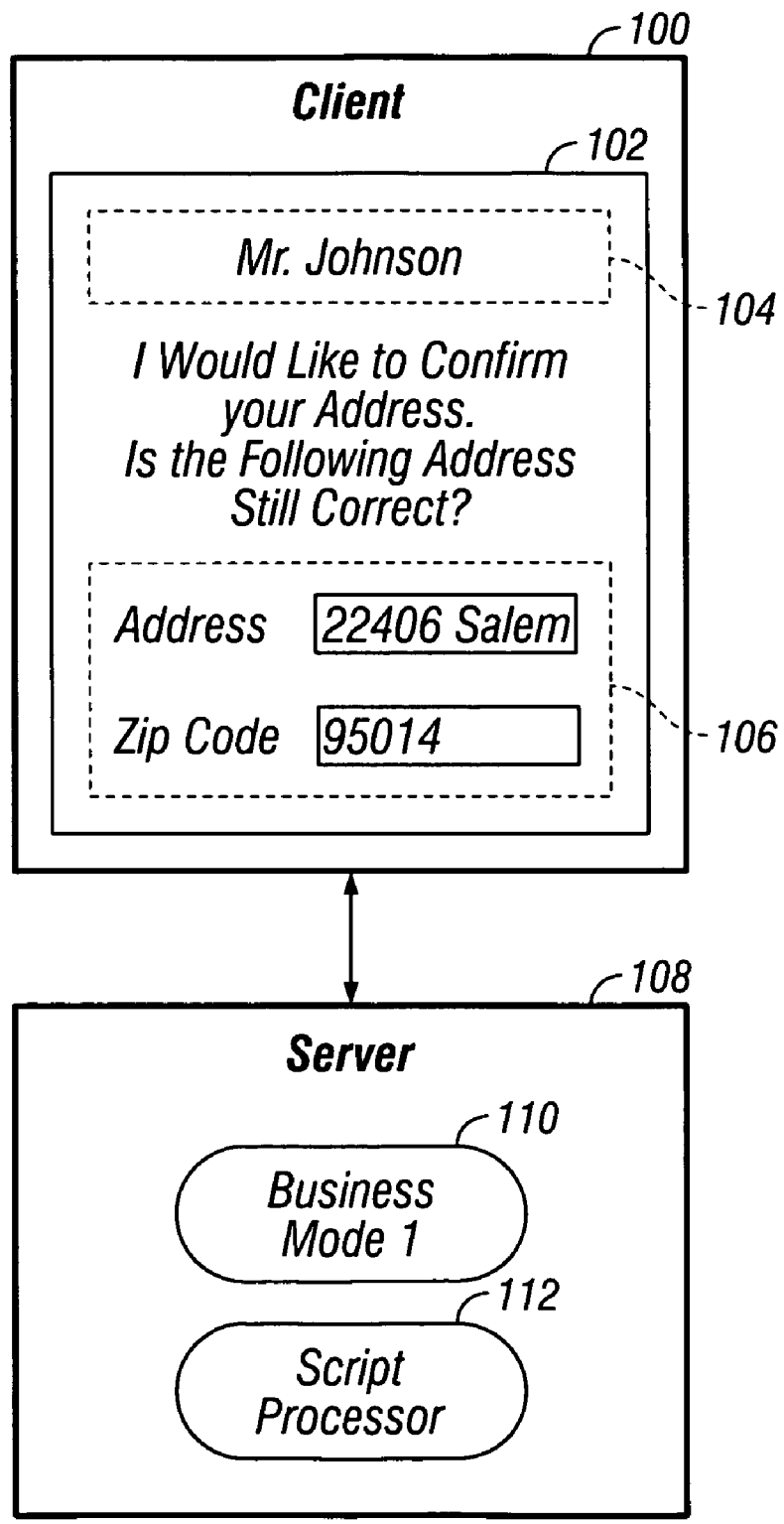
FIG. 1 illustrates a high-level block diagram of an implementation for customized scripting using a client-server architecture.

FIG. 1 illustrates a high-level block diagram of an implementation for customized scripting using a client-server architecture. In FIG. 1, client 100 and server 108 are part of a run-time interaction center. This interaction center could be used as part of a customer relationship management (CRM) system, in one implementation. In a call center environment, a calling agent may communicate directly with a customer using the telephone. In addition, the calling agent uses client 100 (which is a personal computer, in one implementation). Client 100 interacts with server 108 to display customized script 102 to the calling agent, which includes information that is particular to the customer (such as name, address, and zip code). The calling agent may read customized script 102 to the customer as part of a specific session.

Client 100 is coupled to server 108 using a network connection. In one implementation, the network connection is a web-based network connection. Client 100 is capable of displaying customized script 102. Customized script 102 provides a user, such as a calling agent, with direct and easy-to-follow text for communicating specifically with the customer during a specific customer session.

Customized script 102 contains standard script text pertaining to the context of the customer session (such as address confirmation text, as shown in FIG. 1). Customized script 102 also contains customer-specific information in script portions 104 and 106. Script portion 104 contains script information for the title and last name of the customer. Script portion 106 contains script information for the address and zip code for the customer that will be confirmed. Both of script portions 104 and 106 contain customer-specific information that is presented to the calling agent during the session with the customer, so that script 102 is tailored specifically for that customer. The agent simply needs to read script 102, and does not need to commit any of the information to memory.

In one implementation, script portion 106 is populated both with address and zip code information. In another implementation, script portion 106 will contain information for one of the two fields shown. For example, if the agent has previously confirmed the customer's zip code, then only the address field will be shown for confirmation in script 102. This feature improves the flow of the session with the customer, and presents the agent with only those data entry fields (e.g., the address field) that are currently required.

After reading script 102, the agent may receive updated address or zip code information. In this case, the agent can use the text fields shown in script portion 106 to modify the address or zip code information, as appropriate.

Server 108 includes business model 110 and script processor 112. Server 108 obtains information for the session between the calling agent and the customer from client 100. The information is obtained as a result of manual input by the calling agent, in one implementation. Server 108 uses business model 110 and script processor 112 to generate customized script 102 that is sent back to client 100 for display. Business model 110 includes business-level definitions and profiles. Business model 110 is used to manage the business functionalities for the system. In one implementation, business model 110 is an object-oriented business model containing a series of business classes. Script processor 112 manages the definitions and configuration profiles for scripts. Business model 110 and script processor 112 are used in conjunction to process session information sent from client 100 and generate output information. Business model 110 uses the session information, in conjunction with previously acquired information for the customer (in one implementation), to create a business context for the given session, containing information that is particular to the customer. Script processor 112 obtains a script template from its repository to begin building a script. Script processor 112 uses the script template, along with the information provided by business model 110, to create customized script 102. Server 108 then sends customized script 102 to client 100.

Figure 2:
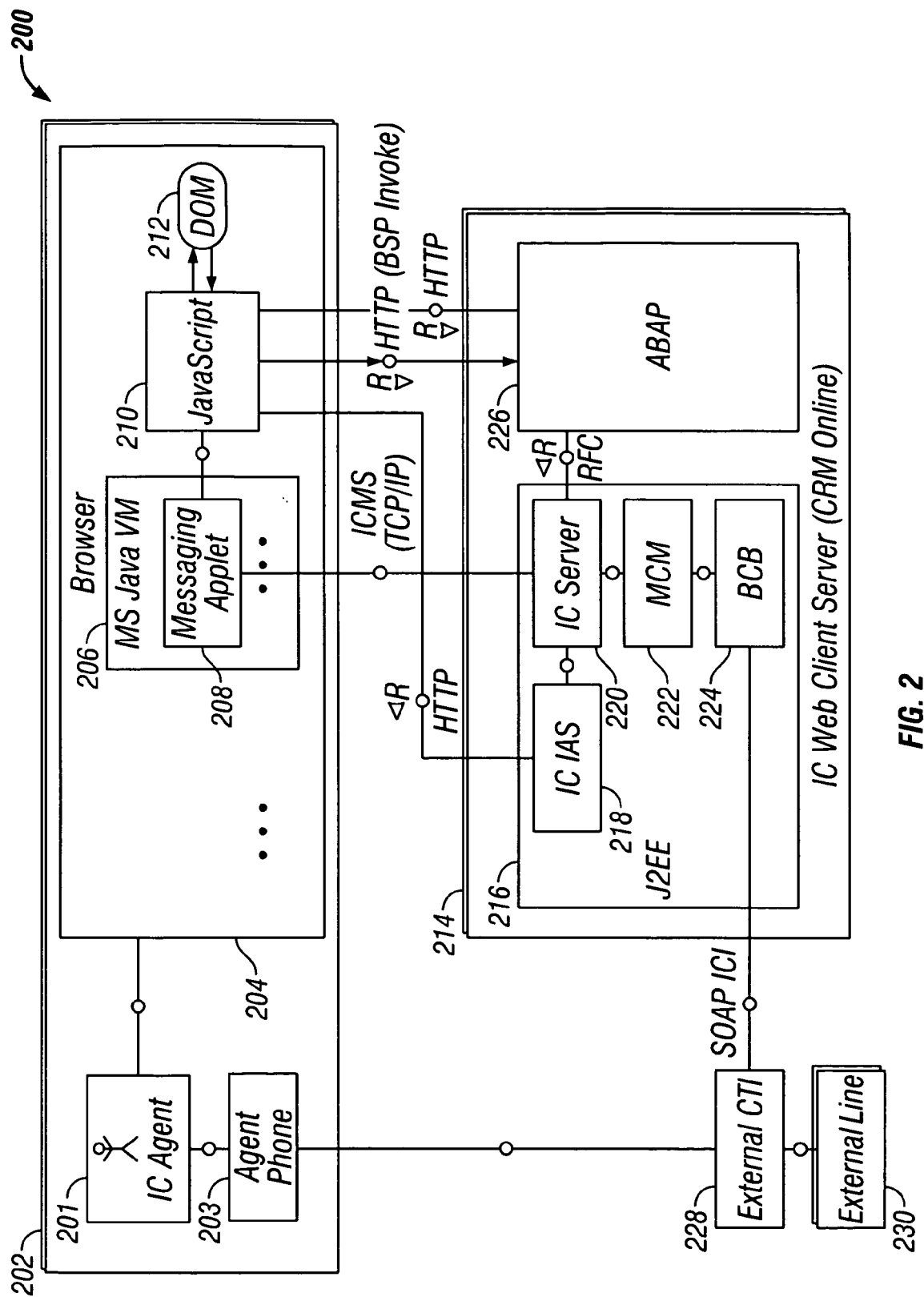
FIG. 2 illustrates a block diagram of a system that is capable of providing customized scripting functionality, according to one implementation.

FIG. 2 illustrates a block diagram of a system that is capable of providing customized scripting functionality, according to one implementation. In one implementation, the components shown in system 200 are interconnected to provide customized scripting to calling agent 201. Calling agent 201 (in one implementation) uses browser 204 while interacting with a customer in a session (such as in a telephone conversation). Information about this session is entered into the system by the agent using browser 204. As a result, a request is sent to server system 214. Server system 214 processes the information and generates a customized script for the session with the customer. The customized script contains information particular to the customer. The script is sent back to browser 204 (in client 202) for display to calling agent 201. Calling agent 201 is then able to read the script to the customer over the telephone.

In the implementation shown in FIG. 2, system 200 is part of an Interaction Center (IC) in an e-business environment. System 200 includes client entity 202 and server system 214. Client entity 202 provides various client-side functionalities. In this implementation, in which system 200 functions as an Interaction Center (IC), a calling agent may use client entity 202 while interacting with a customer (e.g., via phone, email, chat, etc.). Client entity 202 is operatively coupled to two different servers in server system 214: server entity 226 (ABAP), and server entity 216 (J2EE). Server entities 226 and 216 provide different server-side functionalities (in this implementation), and provide server system 214 with a distributed-functionality architecture. ABAP server 226 is coupled with J2EE server 216 via a remote function call (RFC) interface. Using RFC, these servers may share session data for a given user context on client entity 202. External computer telephony integration (CTI) component 228 is coupled to agent phone 203 of client entity 202, and provides an external phone functional interface. External line 230 provides a line interface to external CTI 228. External CTI 228 also propagates event information via a Simple Object Access Protocol (SOAP) interface into server system 214 (and directly to business communication broker (BCB) 224). During operation, calling agent 201 uses browser 204 on client entity 202 to interact with a customer. As a result of the interaction, client entity 202 propagates events particular to the transaction (or user context of agent 201) to server system 214. ABAP server 226 and J2EE server 216 create independent sessions (containing state information specific to the transaction initiated on client entity 202). These independent sessions are then coupled to form a common virtual session for the user context, and data synchronization is achieved in server system 214.

Client entity 202 includes browser 204. Browser 204 is utilized by a user, which is shown as IC call agent 201 in FIG. 2. In an e-business environment, a call agent may use browser 204 on client entity 202, as well as other tools (such as agent phone 203), when interacting with a customer. Such interactions are part of customer relationship management (CRM), in some implementations. CRM is an information industry term for the methodologies, software, and often Internet capabilities that help an enterprise manage customer relationships in an organized way. In FIG. 2, browser 204 includes Java virtual machine (VM) 206, which includes run-time messaging applet 208 for messaging operations. JavaScript module 210 is used to implement an external interface to server system 214, and the code interacts with document object model (DOM) 212, in one implementation. DOM 212 is a platform and language-neutral interface that allows programs and scripts to dynamically access and update the content, structure, and style of documents.

Client entity 202 is coupled to server system 214 using two interfaces. The first interface is a web-enabled Hypertext Transfer Protocol (HTTP) request/response interface. The second interface is a Transmission Control Protocol/Internet Protocol (TCP/IP) interface. In one implementation, the TCP/IP interface provides a dedicated, persistent, and bi-directional connection between client entity 202 and server system 214. JavaScript module 210 used by browser 204 manages HTTP requests that are sent to server system 214. HTTP requests are sent both to ABAP server 226 and to J2EE server 216 (using IC Interactive Scripting (IAS) module 218). In one implementation, HTTP requests are sent only from client entity 202 to ABAP server 226. The TCP/IP interface couples client entity 202 directly to J2EE server 216. A messaging service (in IC Server 220) operates on J2EE server 216 to form the server side of the TCP/IP interface, and messaging applet 208 running on browser 204 forms the client side of the interface. Messaging applet 208 running on browser 204 exposes an interface to the client code (JavaScript 210) for subscription, notification of incoming messages, and sending of outgoing messages. The persistent connection allows client 202 and J2EE server 216 to communicate on an as-needed basis.

Server system 214 includes ABAP (enterprise) server 226, and Java 2 Platform, Enterprise Edition (J2EE) server 216. ABAP is a programming language for developing applications on an SAP system (which is a widely installed business application system). ABAP is an object-oriented programming language. J2EE is a Java platform designed for large enterprise systems. J2EE simplifies application development, and uses standardized, reusable modular components. In other implementations, other structured or object-oriented programming languages may be used on server 226. IC Server module 220 is the container for all Java components, and provides a basic session management. ABAP server 226 and J2EE server 216 illustrate the distributed server architecture of server system 214.

ABAP server 226 is able to communicate with J2EE server 216 using a remote function call (RFC) interface. In other implementations, different methods of communication between ABAP server 226 and J2EE server 216 are used. In one implementation, a remote method call (RMC) interface may be used.

J2EE server 216 includes BCB component 224 that is coupled with external CTI 228 using a SOAP interface. BCB 224 is coupled with MCM 222 for handling events across the multi-channel interface. Various external conditions in system 200 may trigger events that need to be processed. For example, certain multi-channel events (e.g., phone, chat, etc.) may occur as a result of call agent interaction with a customer. These events can be propagated, in one implementation, to J2EE server 216 using a multi-channel connection. In one implementation, SOAP is used for the multi-channel interface into J2EE server 216. External CTI 228 generates multi-channel events that are propagated from BCB 224 to MCM 222, and then further processed by IC Server 220.

Figure 3:
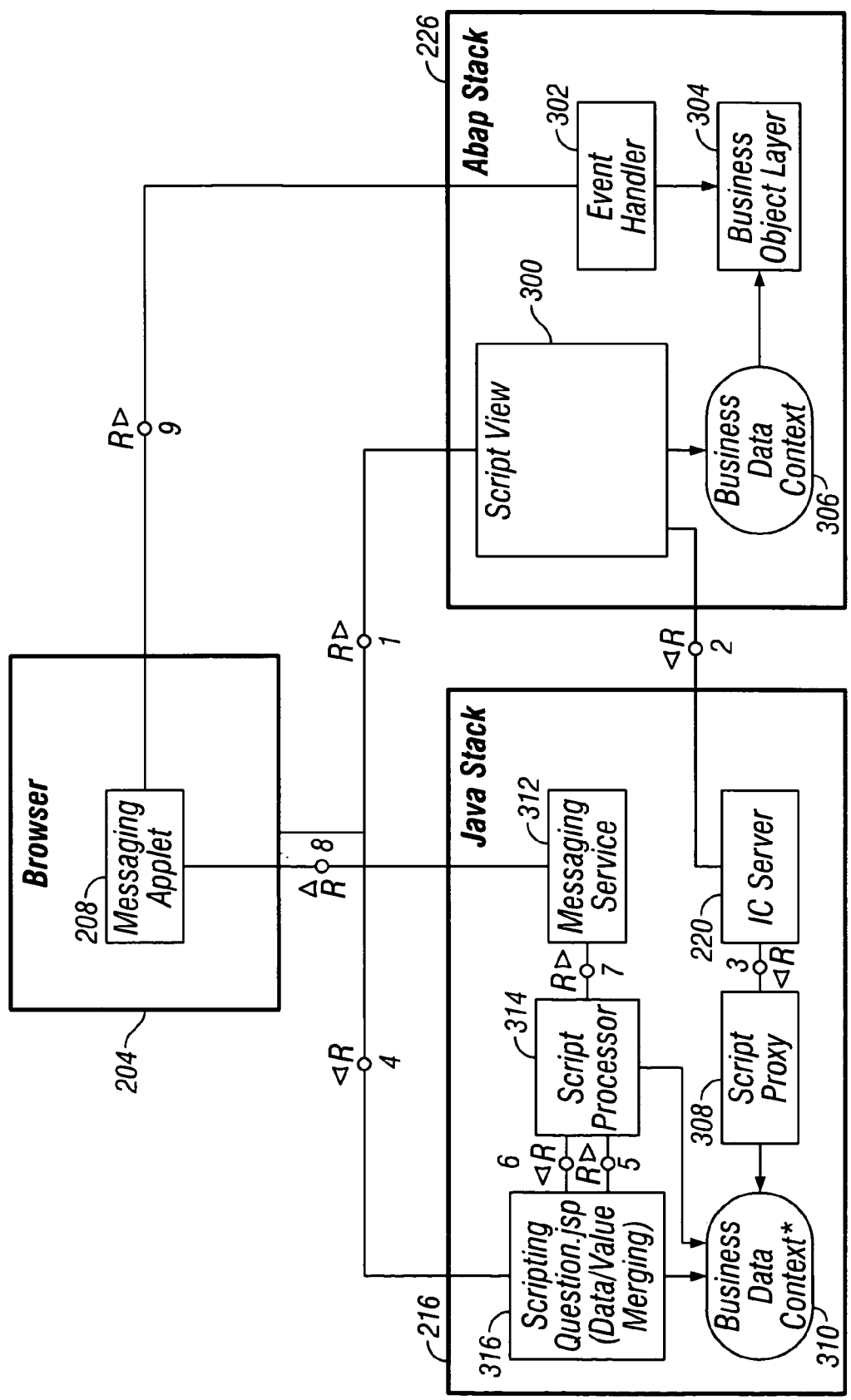
FIG. 3 illustrates a block diagram of a flow of information between various components shown in FIG. 2.

FIG. 3 illustrates a block diagram of a flow of information between various components shown in FIG. 2. In FIG. 3, browser 204 is operatively coupled to ABAP server 226 and J2EE server 216. ABAP server 226 is also coupled to J2EE server 216. In one implementation, these components are interconnected to provide customized scripting to a calling agent. The calling agent (in one implementation) uses browser 204 while interacting with a customer in a session (such as in a telephone conversation). Information about this session is entered into the system by the agent using browser 204. As a result, a request is sent to server 226 (and also to server 216). These servers 226 and 216 process the information and generate a customized script for the session with the customer. The customized script contains information particular to the customer. The script is sent back to browser 204 for display to the calling agent. The calling agent is then able to read the script to the customer over the telephone.

In one implementation, a more detailed implementation is now described, making reference to specific components in FIG. 3. First, in step 1, a page for scripting is requested. Browser 204 sends this request to script view component 300 within ABAP server 226 (on its run-time stack). In one implementation, a Business Server Pages (BSP) page is requested by browser 204. BSP's are active pages customized to business-oriented applications. In step 2 shown in FIG. 3., the page for scripting triggers a request from script view component 300 to IC server 220 on J2EE server 216 for sending contents of the transaction with a user who is using browser 204. In one implementation, in which the transaction is a business-oriented transaction, script view 300 sends the contents of business data context 306 to IC server 220. Business data context 306 is generated by using business object layer 304, which manages the business object model for ABAP server 226.

In step 3, script proxy 308 receives the data for the transaction, and stores the data as business data context 310, which is a replication of business data context 306 in ABAP server 226. A response is sent back from J2EE server 216 to ABAP server 226, which returns a response to browser 204. The response includes a page with an I frame (supported in versions 4.0 and above of HTML) pointing to a Java Server Pages (JSP) page for J2EE server 216. In Step 4, browser 204 uses the I frame to make a request for the JSP page to JSP component 316 on J2EE server 216. In step 5, JSP component 316 makes a request to script processor 314 as to which scripting question (in one implementation) needs to be rendered to a user of browser 204. Data and value merging will occur as a result of these and subsequent operations. In step 6, script processor 314 returns the question that needs to be presented, and JSP component 316 replaces various template placeholders (such as [First Name], [Last Name], etc.) with corresponding and appropriate values from business data context 310. JSP component 316 also accesses the data for various other input fields of the question (such as radio buttons, check boxes, text fields, etc.) that are bound to fields of business data context 310. JSP component 316 constructs an HTML reply (in one implementation) based on the dynamic page, and sends it back to client 204 for display.

In the event that browser 204 sends an HTML POST request to J2EE server 216, script processor 314 compares the key-value pairs posted with the data contained in business data context 310 in step 7. In the case that they are different (i.e., the key-value pairs posted by browser 204 are more recent), messaging service 312 (in J2EE server 216) sends these key-value pairs to messaging applet 208 running on browser 204 in step 8. In step 9, messaging applet 208 sends a message to event handler 302 on ABAP server 226, upon which business object layer 304 is updated appropriately.

Figure 4:
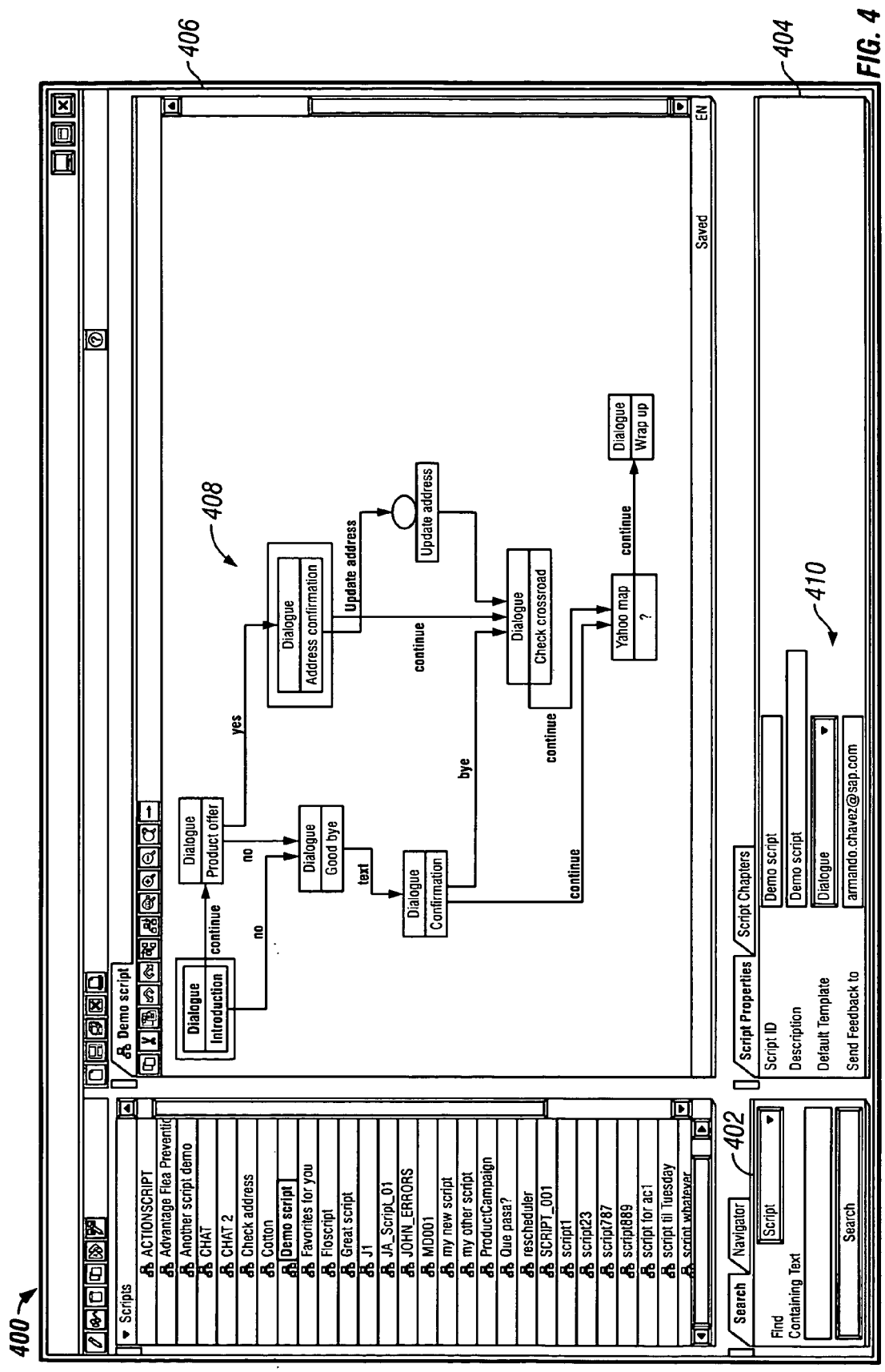
FIG. 4 illustrates a screen display of a script graph for a script session, according to one implementation.

FIG. 4 illustrates a screen display of a script graph (for a model script) within a script editor, according to one implementation. The script graph 408 shown in FIG. 4 may be developed by a script designer, in one implementation. The script designer may develop script graph 408 to best suit the needs of calling agents who will be using (or reading) the scripts when they communicate with customers. Script graph 408 shows the overall design of the script that is to be executed by a script processor.

The screen display shown in FIG. 4 includes various screen areas. Screen area 400 shows a repository of objects that includes scripts, reusable pages (e.g., Questions), reusable Answers, and the like. The highlighted script is called "Demo script." Screen area 402 includes a script searching text box. A user may search for various scripts available in the system by typing in search keywords into the text box and clicking on the "Search" button. Screen area 404 contains various script properties for available scripts. Script information 410 includes script identifier information, script description information, template information, and feedback information. A user may enter description information into the text box shown, and may also select a template to use for a given script. As shown from information 410, "Demo script" is the current script that has been selected.

Screen area 406 contains a window for script graph 408 for "Demo script." Script graph 408 shows a graphic representation of a demo script in block-diagram format. Script graph 408 may be created by a script developer, and specifies which screens are to be displayed to a user when executing the scripts, and in what order. Each of the nodes in script graph 408 (which are shown as blocks) represent the screens (and viewsets) that will be displayed, and the edges linking the nodes represent the buttons and events in the screens. In two nodes linked by an edge, for instance, the edge is associated with a button or event in the screen attached to the source node (in one implementation), and when such a button is pressed, or when such an event occurs, the user will be directed to the screen attached to the target node. In addition, a node can be linked to certain text that is displayed on the screen when the script execution gets to such node.

In script graph 408, there are a series of dialogue nodes, indicating that such nodes include dialogue script information for a user. In one implementation, a script contains questions and answers. The questions are just plain text, and answers are push buttons that are used to navigate from question to question. In script graph 408, the nodes shown are: introduction, product offer, good-bye, address confirmation, confirmation, check crossroad, and wrap up. Script graph 408 also includes a "Yahoo map" node, for showing map information to a user. The arrows and corresponding text show the buttons and events linking the nodes together. For example, in the introduction dialogue node, an event or button indicating "continue" causes flow to proceed to the product offer dialogue node. An event or button indicating "no" causes flow to proceed to the good-bye dialogue node. Script graph 408 represents the entire set of screens to be displayed in a given script session.

As shown in script graph 408, the script begins with an introduction (as shown in the "Introduction" dialogue node). A calling agent will read this script to a customer at run time. If the customer wishes to continue, the script continues with a product offer (as shown in the "Product offer" dialogue node). If, at this point or during the introduction, the customer does not wish to proceed, the flow in script graph 408 moves to the "Good bye" dialogue node, which is followed by the "Confirmation" node. Flow then continue to the "Check crossroad" node or Yahoo map node.

If the customer does wish to pursue the product offer, then script graph 408 proceeds to the "Address confirmation" dialogue node. If the customer provides updated address information, then the calling agent can enter the new information into the system. Script graph 408 then proceeds to the "Check crossroad" dialogue node (to obtain crossroad information from the customer). Once the crossroad information is obtained, a Yahoo map can be displayed to the calling agent, which can be communicated to the customer. Finally, the script in script graph 408 concludes with the "Wrap up" dialogue node. In FIG. 4 (and also in subsequent figures showing screen displays), the screen display may be presented within a web browser, such as Netscape or Internet Explorer.

Figure 5:
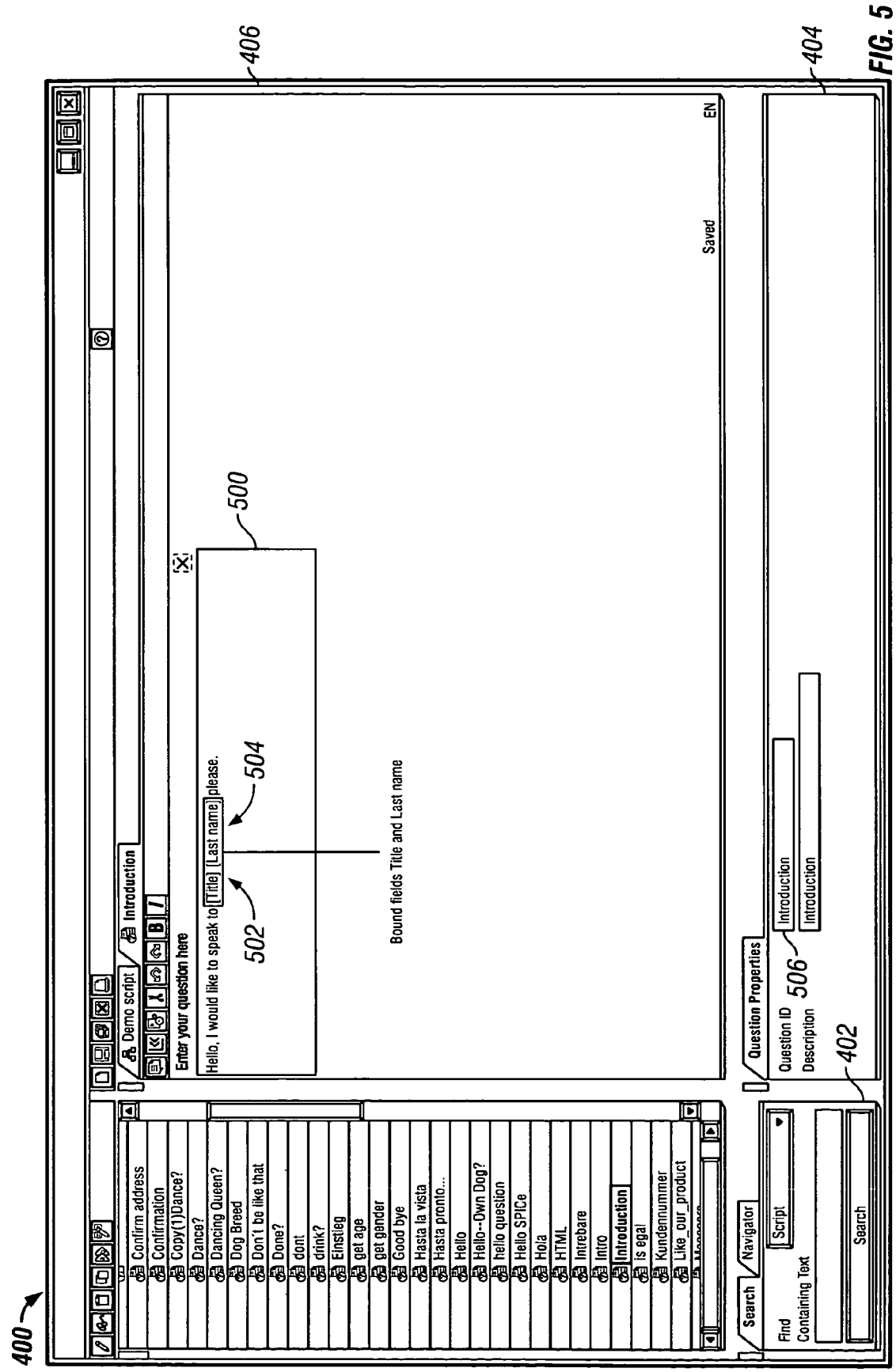
FIG. 5 illustrates a screen display of a script editor, according to one implementation.

FIG. 5 illustrates a screen display of a script editor, according to one implementation. In FIG. 5, the screen display again shows many of the screen areas described in FIG. 4. In particular, FIG. 5 shows the definition of the "Introduction" script page (previously shown as a node in script graph 408 in FIG. 4). Screen area 400 in FIG. 5 now shows the different pages that have been created in the script editor, which can be reused in any script by simply dragging and dropping them into script graph 408 shown in FIG. 4. The highlighted page is the "Introduction" page. Screen area 402 includes the fields described earlier relating to script searching. Screen area 404 includes the properties for the selected page. As shown in FIG. 5, field 506 includes the identifier "Introduction" (relating to the node), and a description field is also shown.

Screen area 406 in FIG. 5 includes page-editing area 500. A user may use page-editing area 500 to define the contents of this portion of the script. In the example shown in FIG. 5, a user is creating an introduction to the "Demo script" in page-editing area 500. The page text is described in the form of a question. Pages may contain questions or answers, in various implementations.

A user, such as a calling agent, may read the text shown in page-editing area 500 as an introduction when speaking with a customer. The introductory text reads: "Hello, I would like to speak to [Title] [Last name] please." The two fields that contain placeholders are bound field 502 ([Title]) and bound field 504 ([Last name]). When a user uses page-editing area 500 to create the introductory text, the user will not know the specific customer's title or last name up front, and uses bound fields 502 and 504 as placeholders. At run time, when a calling agent is speaking, or interacting, with a given customer, bound fields 502 and 504 will be substituted with the proper title and last name of that customer.

Figure 6:
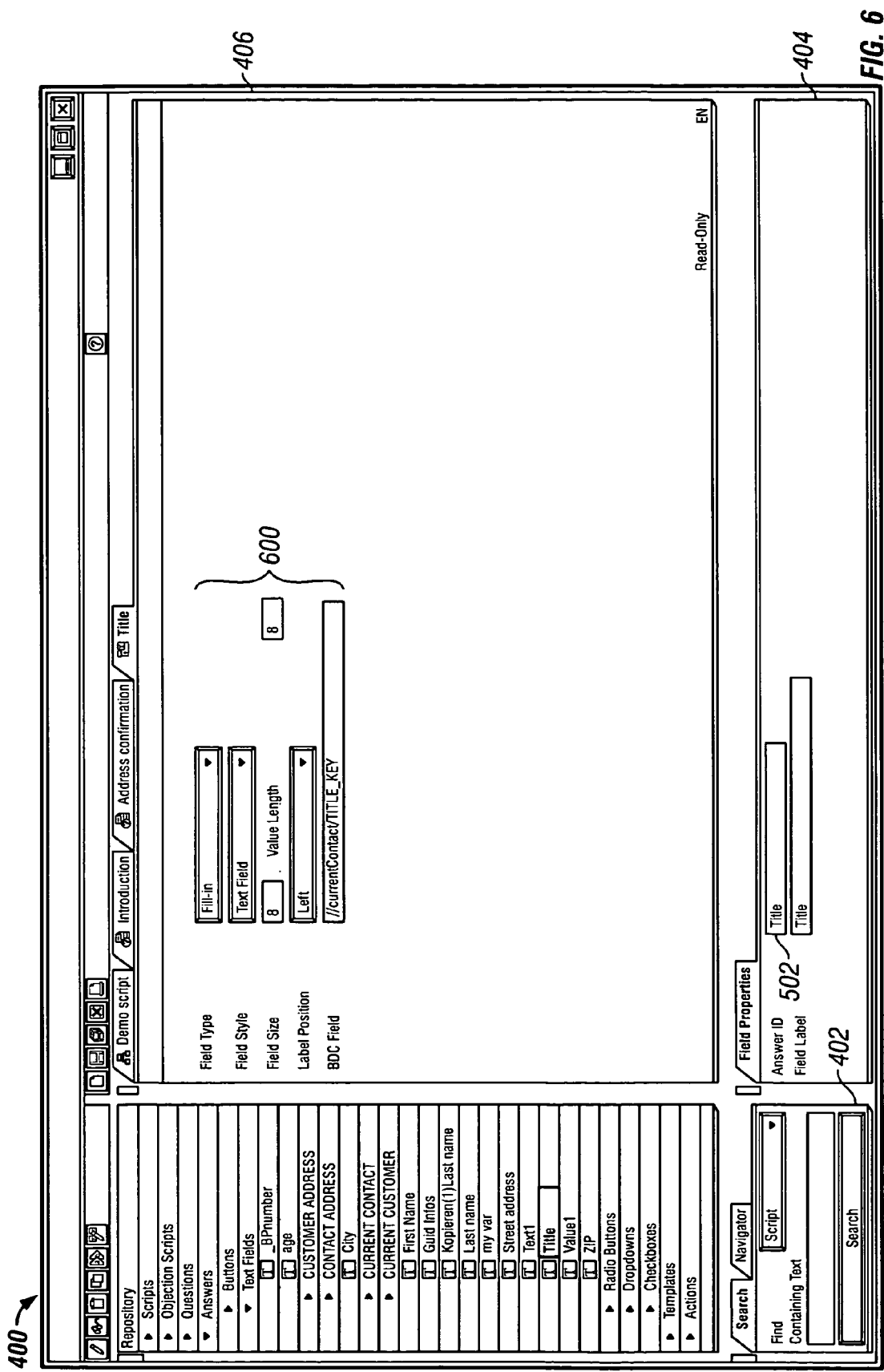
FIG. 6 illustrates a screen display of a definition of one of the bound fields shown in FIG. 5.

FIG. 6 illustrates a screen display of a definition of bound field 502 shown in FIG. 5. A user may define a particular bound field of a scripting node (or segment) using the format and procedure shown in FIG. 6, and may also bind the field directly to a particular component in a business context (in one implementation). The bound field, when defined, can also be saved in a repository, and used in multiple other scripts in the system.

In FIG. 6, the screen display contains various screen areas, similar to those described in earlier figures. For example, screen area 400 contains a set of different objects available in the scripting repository. The repository in FIG. 6 includes scripts, objection scripts, questions (e.g., pages), answers, templates, and actions. Various scripts can be created in the form of questions or answers, and can be categorized as such. Within the answers menu of screen area 400 are various text fields, including bound fields. The text field of "Title" is currently selected, as shown in FIG. 6. Screen area 402 includes various script searching fields, as similarly described in FIG. 4.

Screen area 404 includes the field properties for the item selected in screen area 400. As shown in FIG. 6, screen area includes an answer identifier and field label. The answer identifier shown is that of bound field 502 ([Title]). The field label contains a text box, in which a user may modify the label name.

Lastly, screen area 406 includes bound field definition 600 for bound field 502. In general, a bound field definition can contain one or more field components. These field components include: (1) a field identifier (ID); (2) a field type; (3) a field style; (4) a field value length; (5) a field size; (6) a label position; (7) possible entries; and/or (8) a reference expression. The use of these field components provides a simple yet powerful way to define a bound field without having to write any software code, and also provides an easy and effective way to map a field definition to a specific object field (in an object model), in one implementation. In one implementation, references to business object fields are used.

The field identifier is a unique identifier for the bound field. The field type represents the type of the bound field. Examples of a field type are: single choice, multiple choice, yes/no, and fill-in the blank. The field style represents the style in which the field is shown to a user. Examples of a field style are: text field, check box, radio button, drop-down menu, and memo. The field value length is the number of characters that the bound field can contain. The field size is the size, in pixels, of the bound field to be displayed on a screen. As such, the field size component only applies to a text or memo field. The label position is the display position of the bound field. Examples of a label position are: right, left, and heading. The possible-entries component shows the possible entries for the field. As such, this component applies only to single or multiple-choice fields. Finally, the reference expression is one that binds the field to a specific object field. The object field is one field in an object definition, which corresponds to a run-time object in the system. In one implementation, the reference expression is a business object layer (BOL) XPath expression that binds the field to a business object layer field (within a business application). XPath is a language that describes a way to locate and process items in Extensible Markup Language (XML) documents by using an addressing syntax based on a path through the document's logical structure or hierarchy.

When a script is executed within the context of a business object layer context (as provided by components 306 and 310 shown in FIG. 3), the population of the defined field is automatic. In addition, the update of the business object field in the business data context (BDC) is updated when the defined field is modified in the context of a script. Once the field is defined, a user can introduce such field in questions as variables, or as answers (in input fields).

As shown in FIG. 6, bound field definition 600 for bound field 502 ([Title]) has a field type of fill-in the blank. The field style is a text field. Therefore, a user may type into a text field the title of a customer (at run time) during an interactive scripting session. The field size of bound field 502 is 8 (as per bound field definition 600), and the value length is also 8. The label position is left. Lastly, the BDC field is set to "//currentContact/TITLE_KEY." This reference binds the field to the business data context for the run-time business object. At run time, when a calling agent and customer are engaged in an interactive session (in one example), the run-time business object (within the appropriate context for the transaction with the customer) will include a reference to bound field 502. The calling agent will be shown the title of the customer, according to the business data context for that transaction. The business data context (BDC) contains all of the information specific for the transaction with the customer, including the customer's title and last name.

In one implementation, a user may type in the contents of the BDC field when defining bound field 502. In this implementation, a user will need to know the exact BDC field name. Other implementations may employ other methods for populating the contents of the BDC field.

Figure 7:
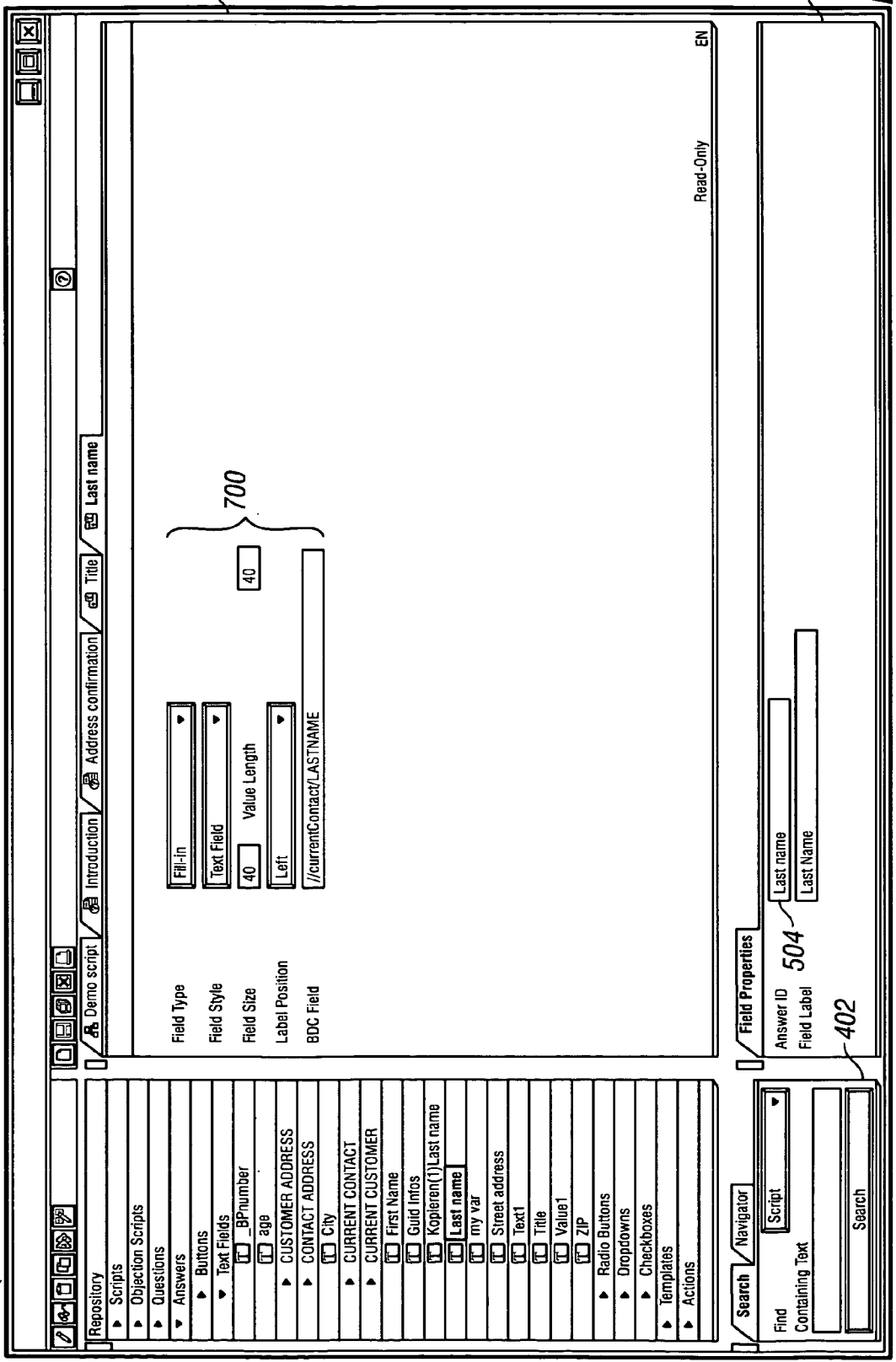
FIG. 7 illustrates a screen display of a definition of another one of the bound fields shown in FIG. 5.

FIG. 7 illustrates a screen display of a definition of bound field 504 shown in FIG. 5. FIG. 7 shows screen areas 400, 402, 404, and 406 (similar to prior figures). Screen area 400 shows the script repository, and shows that the "Last name" text field for "CURRENT CUSTOMER" is selected. Screen area 402 shows the script searching fields, as described previously. Screen area 404 shows the field properties for bound field 504 ([Last name]). The answer ID and field label are both shown as "Last Name."

FIG. 7 also shows screen area 406, having a script editing area for bound field definition 700 of bound field 504. As shown, bound field 504 ([Last name]) has a field type of fill-in the blank, a field style of text field, a field size and value length of 40 (allowing more characters to be typed in than bound field 502, previously described), and a label position of left. Additionally, the BDC field is set to "//currentContact/LASTNAME," which is a direct reference into the business object layer for the given field.

FIG. 5 shows the text of an introductory script in screen area 406. When creating the text in text area 500, a user may type in certain words, such as "Hello, I would like to speak to." Then, to insert a bound field, such as bound field 502 or 504, the user simply needs to select the field from the appropriate menu of screen area 400, and drag-and-drop the selection into text area 500. This inserts the bound field, such as field 502 or 504, into text area 500. At run time, a script processor will replace the placeholders created by the bound fields with the business object fields corresponding to the XPath expressions provided in the BDC fields. This serves as a very nice feature when creating scripts in certain implementations of the invention.

Figure 8:
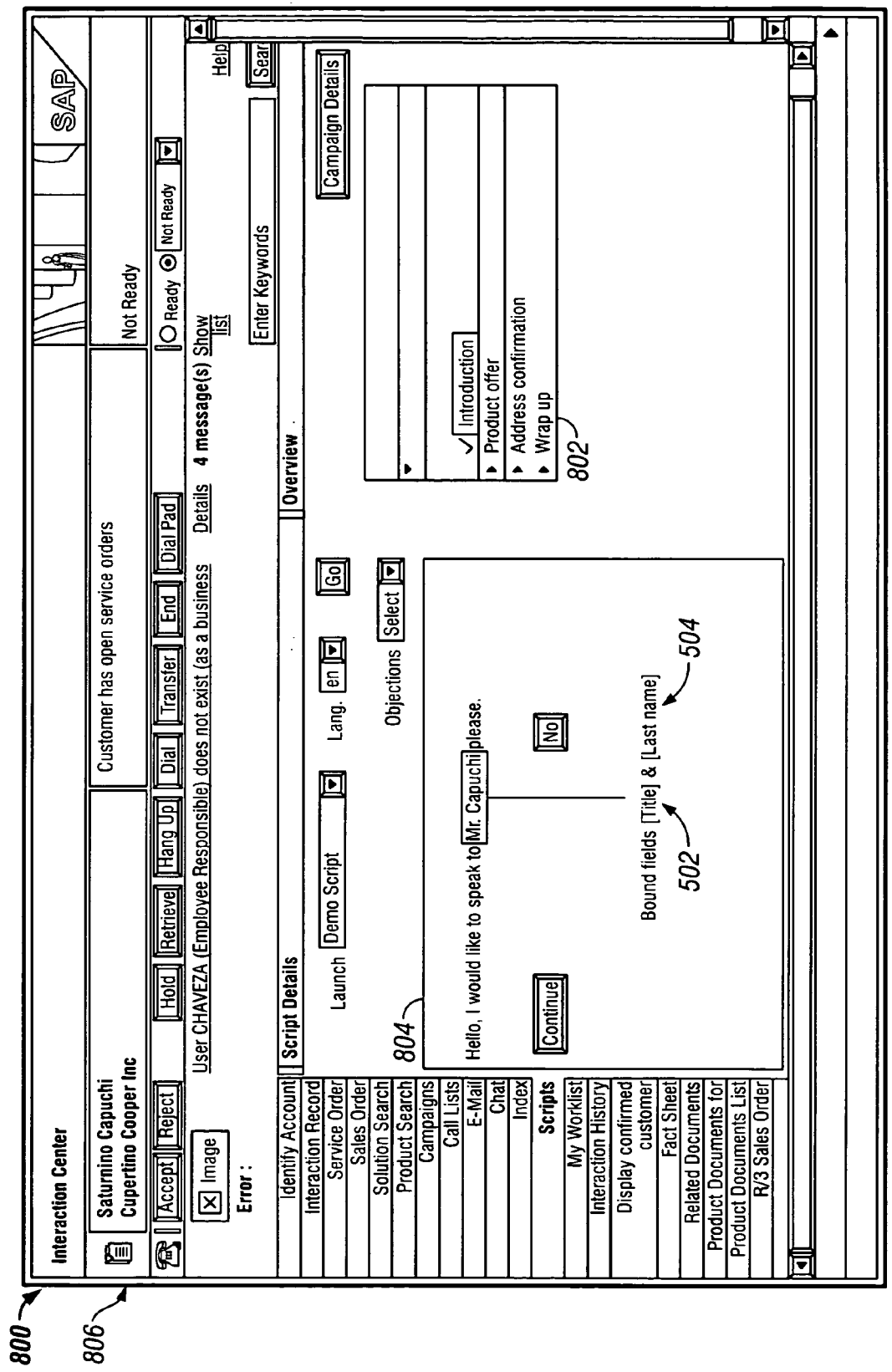
FIG. 8 illustrates a screen display of a script session between a calling agent and a customer using the script shown in FIG. 7.

FIG. 8 illustrates a screen display of a script session between a calling agent and a customer using the script shown in FIG. 7, according to one implementation. In this implementation, the screen display shows an SAP Interaction Center on a web-enabled browser (which uses an Internet connection). The Interaction Center is the run-time environment that a calling agent uses in a transaction with a customer. This transaction provides the business data context for the customer. Within the interactive session, a script is displayed to the calling agent to personalize the session with the customer.

In one implementation, when a script is executed using the Interaction Center, a script processor or script engine drives the sequencing of screens or questionnaires, depending on the script definition. Fields on the questionnaires are automatically associated with business object attributes.

Business objects are well-defined objects (i.e., contain attributes, semantics, cardinality, etc.), and they are managed within the Business Object Layer. For example, one business object may be CURRENT_CUSTOMER, which semantically means the customer that is currently being interacted with in the Interaction Center. The business object uses a communication channel with the script processor to access and update fields as they are needed in the script questionnaires.

FIG. 8 shows screen area 806, which includes information about the customer. As shown in screen area 806, the customer's name is "Saturnino Capuchi" working for "Cupertino Cooper Inc." Screen area 806 also shows that this customer has open service orders. In screen area 800, the calling agent is able to select "Scripts" for the scripting capabilities. Screen area 802 provides overview information of the interactive session between the calling agent and the customer. The Demo script is shown. Certain components of the script include "Product offer," "Address confirmation," and "Wrap up," which correspond to the script nodes shown in script graph 408 in FIG. 4.

Lastly, the script details for the Demo script in the interactive session are shown in screen area 804. Screen area 804 displays the script to the calling agent, so that he/she may read it to the customer. In one implementation, the calling agent may read the script to the customer over the telephone. Because bound fields are used, the script is customized to the given customer (i.e., "Saturnino Capuchi"). As shown, the script is in English. However, the user (i.e., calling agent) may use the pull-down menu to select another script language, in case the user is interacting with a non-English speaking customer.

Screen area 804 shows the run-time text for the script created in FIG. 5. This is the introductory text for the "Demo script." However, as shown in FIG. 8, the placeholders of bound fields 502 and 504 have been replaced with the run-time information (in the business data context) for the customer. The customer's title is "Mr.," and the customer's last name is "Capuchi." In this fashion, the calling agent will easily be able to read the script that is tailored to the interaction with the given customer.

FIG. 8 also shows two buttons "Continue" and "No." The calling agent clicks on the "Continue" button to continue with the script (and transaction), and clicks on the "No" button to discontinue. These buttons relate back to script graph 408 shown in FIG. 4. In script graph 408, the introduction dialogue node has a "continue" arrow pointing to the product offer dialogue node, and a "no" arrow pointing to the good-bye dialogue node. Thus, if the calling agent clicks "Continue," the script will continue to the product offer node (and text), and if the calling agent clicks "No," the script will conclude with the good-bye node (and text).

Figure 9:
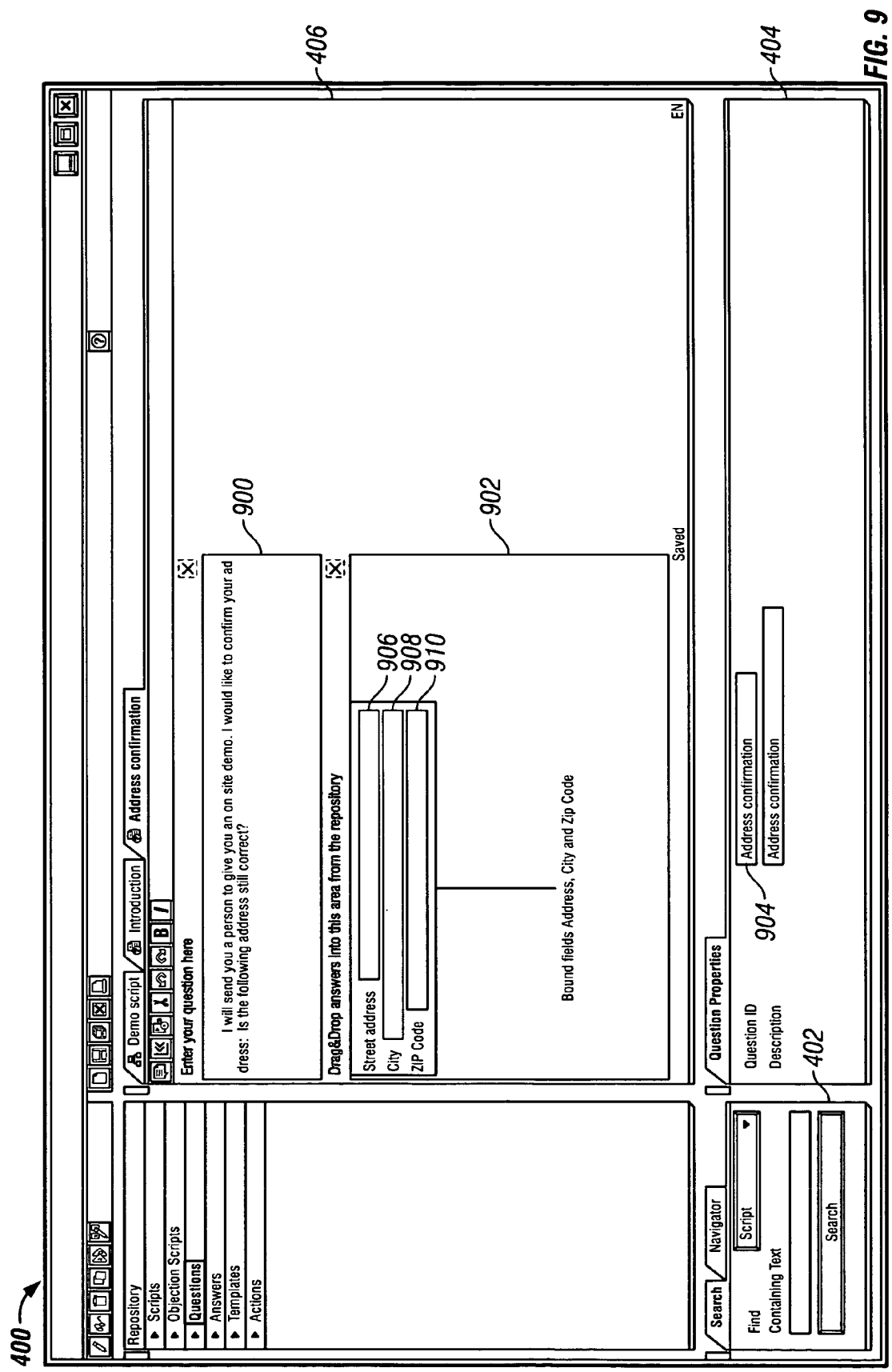
FIG. 9 illustrates a screen display of a page for an address confirmation script, according to one implementation.

FIG. 9 illustrates a screen display of a page for an address confirmation script, according to one implementation. FIG. 9 shows how a script page for address confirmation is created, and how the script page uses its bound fields. Upon creation, a calling agent (in one implementation) may use a script containing such a page when confirming the address of a customer in a given e-business transaction. The "Address confirmation" script page is shown as a node in script graph 408 (shown in FIG. 4).

In FIG. 9, screen area 400 shows the repository of scripts, objection scripts, questions, answers, templates, and actions that may be utilized in script creation. Screen area 402 includes script-searching fields to allow a user to search for scripts in the system (as previously described). Screen area 404 includes the properties of the question script being created or modified. As shown, question identifier 904 indicates that the identifier of the question script is "Address confirmation." The description field is also shown.

Screen area 406 shows the script page editing area for the question (i.e., "Address confirmation") script page. As shown in text area 900, a user creating the script is able to type in the exact text to be used for the question. The text shown in text area 900 will be the precise text shown to a calling agent at run-time. Field region 902 includes the various bound fields associated with the script. Bound field 906 is an address field. Bound field 908 is a city field, and bound field 910 is a zip code field. Each of these bound fields 906, 908, and 910 are associated with the script, and have been previously defined to have text entry fields. In addition, these bound fields have BOL XPath expressions (in one implementation) to specific fields within a business data context, which are properly utilized at run time.

In one implementation, a user may drag and drop fields 906, 908, and 910 (as answers) into field region 902 from screen area 400 (i.e., the repository) after these fields have been defined. When the user drags and drops the fields as such, the BOL XPath expressions are automatically populated with the proper references.

FIG. 9 also shows an "Actions" tab, or menu, in screen area 400. This provides a user with the capability of creating action-based scripting and/or screen navigation. Events will trigger the actions taken in response, and the user has the flexibility of determining the parameters and criteria for the actions. For example, a company may develop a run-time system in which a calling agent is shown specific text or navigable screens, if a customer is within a predetermined age bracket, income bracket, etc. To implement such response, the company may create an action-based rule that uses input (either manually or automatically acquired) relating to the demographics of the customer (in one implementation). The calling agent may, at run time, need to ask the customer for the information, or the system may be able to acquire the information as a result of past interactions with the customer. The action-based rule will then use such information to take appropriate action in response (such as presenting specific navigable screens, scripted text, and the like). In one implementation, the agent (at run time) is presented with an on-line chat window to chat with the customer, wherein the agent's chat window is pre-populated with text specifically targeted for the customer (e.g., a customer within a given age or income bracket).

Figure 10:
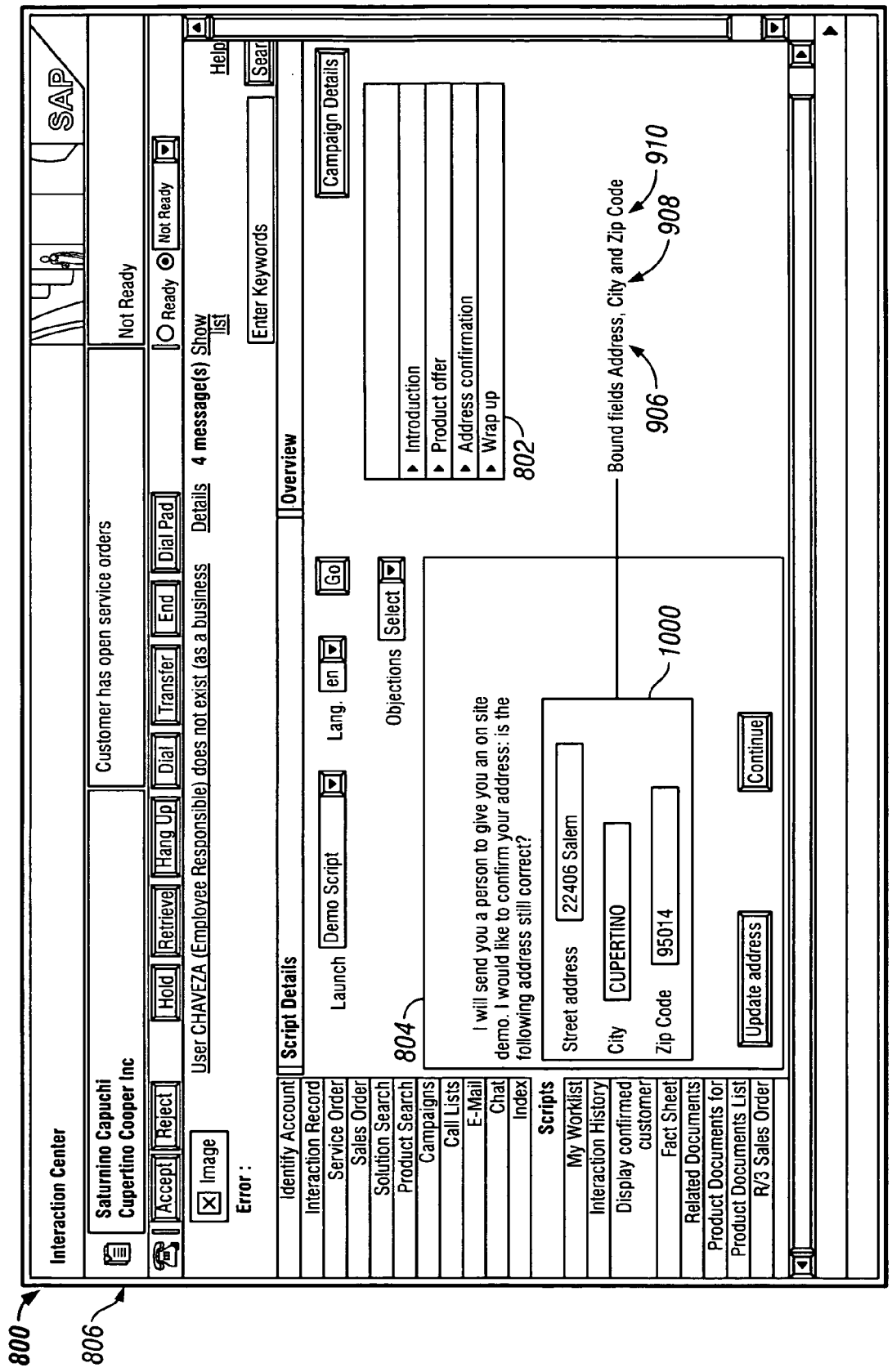
FIG. 10 illustrates a screen display of an script session between a calling agent and a customer using the script shown in FIG. 9.

FIG. 10 illustrates a screen display of a script session between a calling agent and a customer using the script page shown in FIG. 9, according to one implementation. In this implementation, the screen display shows an SAP Interaction Center on a web-enabled browser (which uses an Internet connection). The Interaction Center is the run-time environment that a calling agent uses in a transaction with a customer. This transaction provides the business data context for the customer. Within the interactive session, an address confirmation script is displayed to the calling agent to confirm address information with the customer. In one implementation, the fields displayed to the agent are the only ones required (for data entry or validation) to complete a session with the customer.

FIG. 10 shows screen area 806, which includes information about the customer. As shown in screen area 806, the customer's name is "Saturnino Capuchi" working for "Cupertino Cooper Inc." Screen area 806 also shows that this customer has open service orders. In screen area 800, the calling agent is able to select "Scripts" for the scripting capabilities. Screen area 802 provides overview information of the interactive session between the calling agent and the customer. Certain components or pages of the script include "Product offer," "Address confirmation," and "Wrap up," which correspond to the script nodes shown in script graph 408 in FIG. 4.

Lastly, the script details for the address confirmation script in the interactive session are shown in screen area 804. Screen area 804 displays the address confirmation script to the calling agent, so that he/she may read it to the customer. In one implementation, the calling agent may read the script to the customer over the telephone.

Screen area 804 shows the address confirmation text from text area 900 in FIG. 9 (which was created during script creation), and also displays the address confirmation bound fields 906, 908, and 910 in field area 1000. At run time, these bound fields are resolved (from the business data context for the transaction with the customer), and the fields are populated with the contextual information for "Saturnino Capuchi." In this fashion, bound fields 906, 908, and 910 (when resolved) display the most current address, city, and zip code information to the calling agent in field area 1000 so that the agent may confirm (and update, as necessary) the information for "Saturnino Capuchi."

As shown, the address confirmation script is displayed in English. In other implementations, the script may be displayed to the calling agent in other languages.

If the address information is correct, the calling agent may click on the "Continue" button (which provides the script functionality shown in script graph 408 in FIG. 4). If the calling agent needs to type in updated address information in field area 1000, he/she may then click the "Update address" button to update such information. Script graph 408 in FIG. 4 also shows this functionality within the script.

Figure 11:
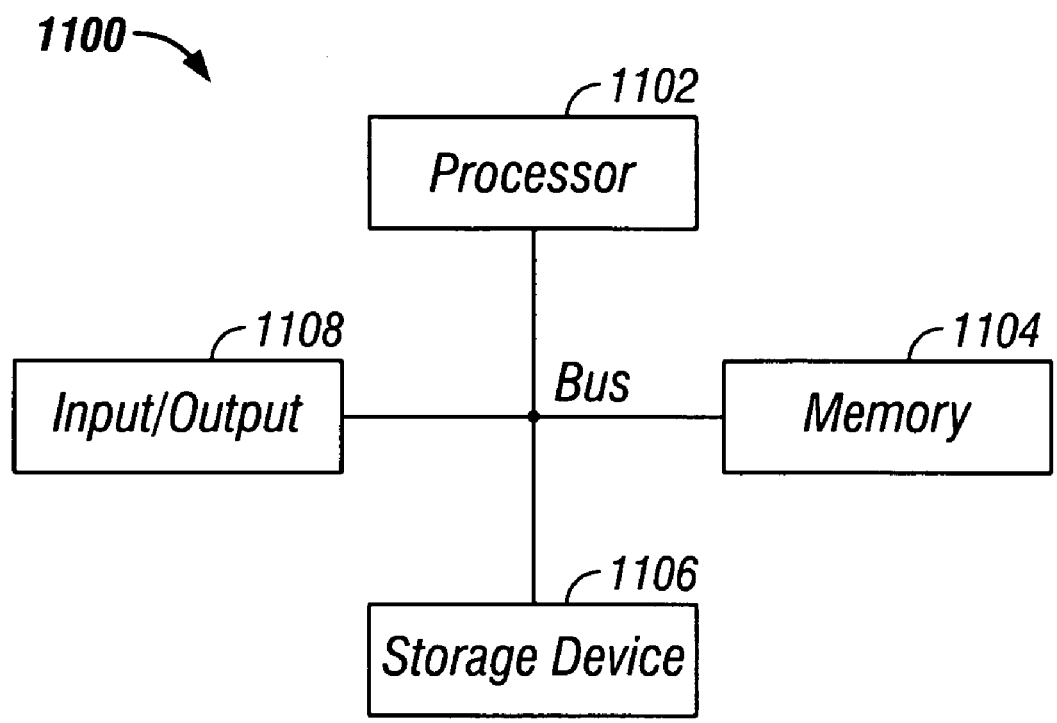
FIG. 11 illustrates a block diagram of a computing system having various computer-readable media.

FIG. 11 illustrates a block diagram of a computing system having various computer-readable media. Various implementations of the invention may be embodied in hardware, software, or a combination of hardware and software. For example, client entity 202, server entity 226, and/or server entity 216 (each shown in FIG. 2) may be implemented by a system similar to the one shown in FIG. 11. System 1100 includes processor 1102, memory 1104, storage device 1106, and input/output device 1108. Each of components 1102, 1104, 1106, and 1108 are interconnected using a system bus. Processor 1102 is capable of processing instructions for execution within system 1100. In one implementation, processor 1102 is a single-threaded processor. In another implementation, processor 1102 is a multi-threaded processor.

Memory 1104 stores information within system 1100. In one implementation, memory 1104 is a computer-readable medium. In one implementation, memory 1104 is a read-only memory (ROM). In one implementation, memory 1104 is a random-access memory (RAM). In one implementation, memory 1104 is a volatile memory unit. In one implementation, memory 1104 is a non-volatile memory unit.

Storage device 1106 is capable of providing mass storage for system 1100. In one implementation, storage device 1106 is a computer-readable medium. In one implementation, storage device 1106 is a floppy disk. In one implementation, storage device 1106 is a hard disk. In one implementation, storage device 1106 is an optical disk. In one implementation, storage device 1106 is a tape.

Input/output device 1108 provides input/output operations for system 1100. In one implementation, input/output device 1108 is a keyboard and/or pointing device. In one implementation, input/output device 1108 is a display unit. In some implementations, system 1100 does not include input/output device 1108.

The various implementations of the invention described above provide many advantages. For example, customized scripting may be used to capture the business expertise in a company, wherein scripts are used to standardize various processes. Customized scripting can integrate dialogue at every stage of a customer transaction, and enables call center agents to have high quality interactions with customers by limiting the number of choices the agents need to make and amount of knowledge they need to have, in order to have an effective customer interaction. Customized scripting reduces the complexity of a transaction by presenting a user with only those screens that are necessary to perform a task, thereby making navigation more intuitive. The agents do not need as much training, because the complexities of transactions are reduced.

In addition, customized scripting has capabilities for simplifying data entry. For instance, there are some forms (such as a purchase order) that may be quite complex for an entry-level agent to fill out. Some of these forms can be simplified by creating a script that only presents those fields that are necessary to complete a transaction. For example, when creating a telemarketing script, it may be that some of the information in the purchase order is not required, and therefore such fields can be hidden from the agent to reduce complexity.

Various implementations of bound fields allow non-technical users (such as marketing campaign planners, or call center managers) to simplify complex business transactions such as purchase and service orders, and present to the novice user the transactions in a wizard-like fashion. At each step in the wizard, the end user can have instructions on how to fill out the presented field(s), and also the actual dialogue for communicating with the customer. Using its navigation capabilities, scripting can prevent the user from seeing information that is not necessary for the business scenario. For example, in a cash purchase scenario, the script will prevent the user from seeing the credit card details, billing address, and so on. In other words, the original purchase order is fragmented into little questionnaires, and the end-user will only see those questionnaires that are necessary to successfully complete the scenario.

A number of implementations of the invention have been described. Nevertheless, it will be understood that various modifications may be made without departing from the spirit and scope of the invention. Accordingly, other implementations are within the scope of the following claims.

What is claimed is:

1. A computer-implemented method for providing a visual display of a script for a user to use in communicating with a specified person during a session, the method comprising:
receiving, on a computing system, information relating to a specific session being conducted with the specified person;
processing the received information on the computing system to generate output information that specifies a display of a customized script adapted to be spoken by the user to the specified person, the customized script containing a standard script determined by the specific session being conducted and information particular to the specified person; and receiving the output information at a display device and generating thereon a display of the customized script for use by the user during the specific session with the specified person.

2. The computer-implemented method of claim 1, wherein processing the received information on the computing system includes specifying a display of a customized script having one or more fields that are bound to the information particular to the specified person for the specific session.

3. The computer-implemented method of claim 1, wherein receiving the output information at a display device and generating thereon a display of the customized script for use by the user during the specific session with the specified person includes displaying one or more data entry fields to the user, the data entry fields being the only ones required for completing the specific session being conducted with the specified person.

4. The computer-implemented method of claim 1, wherein receiving the output information at a display device and generating thereon a display of the customized script for use by the user during the specific session with the specified person includes displaying the customized script in an on-line chat window for communicate with the specified person.

5. The computer-implemented method of claim 1, wherein the method further comprises using the output information to display one or more navigable screens for use by the user during the specific session with the specified person.

6. The computer-implemented method of claim 1, wherein receiving the output information at a display device and generating thereon a display of the customized script for use by the user during the specific session with the specified person includes displaying the customized script to the user in a web-enabled browser.

7. The computer-implemented method of claim 6, wherein the method comprises providing a visual display of a script for a calling agent to use in communicating with a specified customer during a customer relationship management (CRM) session.

8. The computer-implemented method of claim 6, wherein the method comprises providing a visual display of a script for a user to use in communicating via telephone with a specified person during a session.

9. The computer-implemented method of claim 6, wherein receiving information relating to a specific session being conducted with the specified person includes receiving information manually entered by the user that relates to a specific session being conducted with the specified person.

10. In a computer system having a graphical user interface (GUI), a computer-implemented method for designing a model script for a session between a user and a specified person, the method comprising:

displaying one or more bound field definitions each having a business data context field to reference a specific field in a business model, the specific field in the business model having the capability to store mn-time information for the session that is particular to the specified person;

displaying textual script information adapted to be spoken by the user to the specified person, the textual script information having one or more placeholders; and dragging and dropping the bound field definitions into the placeholders of the textual script information to create the model script.

11. The computer-implemented method of claim 10, wherein the method further comprises creating the bound field definitions using the GUI.

12. The computer-implemented method of claim 10, wherein the method further comprises creating an action-based rule to analyze information that is particular to the specified person and to generate, as a result of such analysis, a screen display containing the model script and the information particular to the specified person.

13. The computer-implemented method of claim 10, wherein the method comprises designing a script for a session between a user and a specified person using a web-enabled browser.

14. The computer-implemented method of claim 13, wherein the method comprises designing a script for a session between a customer care agent and a customer.

15. The computer-implemented method of claim 10, wherein displaying one or more bound field definitions each having a business data context field to reference a specific field in a business model includes displaying one or more bound field definitions each having a business data context field to reference a specific field in an object-oriented business model.

16. A system for providing a visual display of a script for a user to use in communicating with a specified person during a session, the system comprising: a computing system operable to:

receive information relating to a specific session being conducted with the specified person; and process the received information to generate output information that specifies a display of a customized script adapted to be spoken by the user to the specified person, the customized script containing a standard script determined by the specific session being conducted and information particular to the specified person; and a display device to receive the output information from the computing system and generate a display of the customized script for use by the user during the specific session with the specified person.

17. The system of claim 16, wherein the computing system is operable to specify a display of a customized script having one or more fields that are bound to the information particular to the specified person.

18. The system of claim 16, wherein the computing system is coupled to the display device using a web-enabled connection.

* * * * *